United States Patent [19]

Hellermann et al.

[11] Patent Number: 5,061,758

[45] Date of Patent: Oct. 29, 1991

[54] UNSATURATED, ELASTOMERIC, ASYMMETRICALLY, COUPLED BLOCK COPOLYMERS, A DUAL BATCH PROCESS FOR ITS MANUFACTURE AND THEIR USE FOR THE PRODUCTION OF TYPE COMPONENTS

[75] Inventors: Walter Hellermann, Dorsten; Christoph Herrmann; Karl-Heinz Nordsiek, both of Marl; Jürgen Wolpers, Haltern; Hans-Bernd Fuchs, Marl, all of Fed. Rep. of Germany

[73] Assignee: Huels Aktiengesellschaft, Marl, Fed. Rep. of Germany

[21] Appl. No.: 417,699

[22] Filed: Oct. 5, 1989

[30] Foreign Application Priority Data

Oct. 5, 1988 [DE] Fed. Rep. of Germany ....... 3833759

[51] Int. Cl.$^5$ .................................................. C08F 8/02
[52] U.S. Cl. ..................................... 525/193; 525/194; 525/201; 525/237; 525/101
[58] Field of Search ........................................ 525/193

[56] References Cited

U.S. PATENT DOCUMENTS 4,077,893  3/1978  Kioushy ............................. 525/193

Primary Examiner—John C. Bleutge
Assistant Examiner—D. E. Aylward
Attorney, Agent, or Firm—Oblon, Spivak, McClelland, Maier & Neustadt

[57] ABSTRACT

An unsaturated elastomeric, asymmetrically coupled block copolymer of the formula: $(A)_n\text{-}X\text{-}(B)_m$, wherein block A is a block of polybutadiene having a content of uniformly distributed vinyl groups ranging from 8 to 60% and block (B) is a homopolymer of isoprene or a copolymer of at least 10% isoprene with 0 to 60% butadiene and up to 45% styrene, the copolymer having a vinyl unit content of 75 to 90%, X is a radical of a coupling agent and $(m-n) \geq 0$ and $(m+n)$ ranges from 3 to 25.

4 Claims, 1 Drawing Sheet

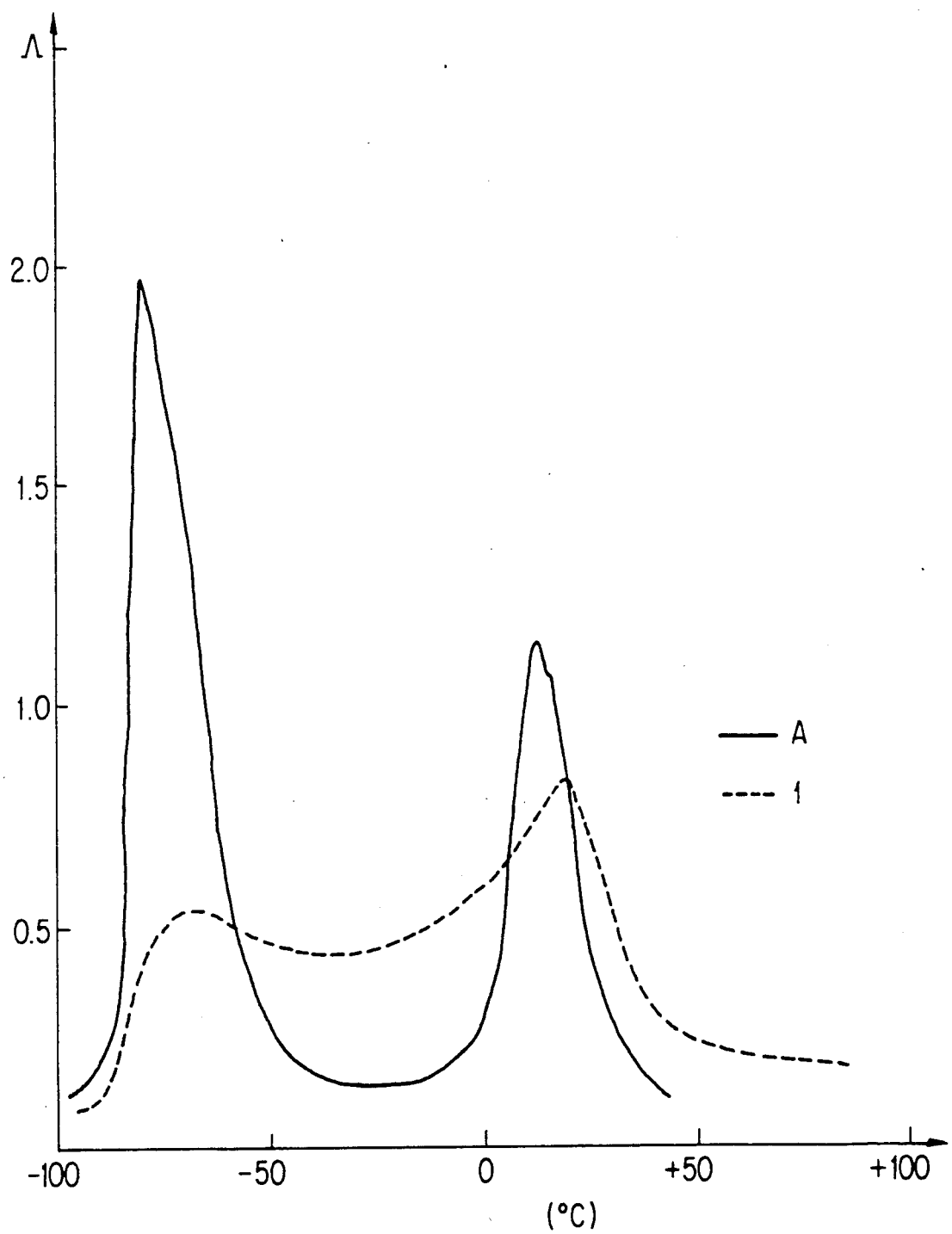

UNSATURATED, ELASTOMERIC, ASYMMETRICALLY, COUPLED BLOCK COPOLYMERS, A DUAL BATCH PROCESS FOR ITS MANUFACTURE AND THEIR USE FOR THE PRODUCTION OF TYPE COMPONENTS

BACKGROUND OF THE INVENTION

1. Field of the Invention

The present invention relates to an asymmetrically coupled copolymer, a dual batch process for its manufacture and its use for the production of tire components.

2. Description of the Background

It is generally known that the properties of a rubber are determined to a significant extent by the shape of its tan delta curve. It is also known that a wide peak in the tan delta curve has a favorable effect on a series of antagonistic rubber properties which are improving the skid resistance, reducing the dynamic heat formation and lowering the rolling resistance of rubber without reducing the abrasion resistance of rubber and providing a consistent level of daily reliable use.

In the past numerous attempts have been made to develop rubbers having a high level of qualities. In order to attain as favorable as possible a compromise between the properties which in part are conflicting, mixtures of different rubbers have been employed. Another avenue which has been followed is to prepare rubber copolymers of two different blocks. Thus, copolymers are known which differ in the nature of their chemical composition and/or their structure. Examples are styrene-butadiene block copolymers, the blocks A and B of which have different styrene and/or vinyl contents. The processing of such copolymers is relatively difficult.

A further possibility to modify the properties of rubber, and in particular to improve the cold flow characteristic resides in coupling the so-called "living copolymers" present at the end of a given growing polymer strand with polyfunctional coupling agent such as a polyhalogenide or a polyalkenyl aromatic compound. Often, however, the coupling yield, i.e. the percentage of coupled products in relation to the total amount of polymerization products, is very low. According to that principle one invariably obtains coupled products, the branches of which are identical with respect to molecular weight, composition and structure. In principle coupled products are also known having different branching. However, those products invariably contain blocks composed of styrene or butadiene units. Apart from the aforegoing, thermoplastic coupling products with different branches are known. To date there has been no indication that such products can be employed in tire manufacture. For example, U.S. Pat. No. 4,248,983 describes a thermoplastic star-shaped block copolymer having the formula: $(A-B/A')_m-X-(A'/B)_n$, which contains 60 to 95% styrene and 40 to 5% of a conjugated diene. Residue A in the formula represents a non-elastomeric polymer segment which contains 80 to 90% styrene. A'/B and B/A' represent elastomeric polymer segments based on styrene and a conjugated diene. These products are manufactured by polymerizing the non-elastomeric segment A, adding an initiator, continuing the reaction by polymerizing a mixture of styrene and a diene and finally coupling the polymer strands. Similar block copolymers are described in U.S. Pat. Nos. 4,180,530; 4,221,884 and 4,248,980 to 4,248,984.

U.S. Pat. No. 4,391,949 describes coating compositions which are prepared from star-shaped block polymers of the formula: $(A-B)_xY-(C)_z$, wherein Y represents the residue of a coupling agent, A the polymer of a monovinyl aromatic compound such as, for example, a polystyrene block, and B and C polymers of conjugated dienes, for example, polybutadiene blocks. The two polymers A—B and C are initially produced in two separate reactors. Thereafter, the contents of both reactors are combined and the coupling agent is added.

All known block copolymers are subject to at least one of the following shortcomings:

i) The block copolymers do not adequately satisfy the increasing standards of rubber properties associated with their use in tire manufacture.
ii) Problems arise regarding the compatibility of the two blocks.
iii) The tan delta curve exhibits only a narrow damping maximum.

A need therefore continues to exist for a rubber which exhibits an improved spectrum of properties.

SUMMARY OF THE INVENTION

Accordingly, one object of the present invention is to prepare a star-shaped rubber which exhibits a tan delta curve having as wide as possible an oscillatory damping region.

Briefly, this object and other objects of the present invention as hereinafter will become more readily apparent can be attained in an unsaturated, elastomeric, asymmetrically coupled block copolymer of the formula: $(A)_n-X-(B)_m$, wherein block A is a block of polybutadiene having a content of uniformly distributed vinyl groups ranging from 8 to 60% and block (B) is a homopolymer of isoprene or a copolymer of at least 10% isoprene with 0 to 60% butadiene and up to 45% styrene, said copolymer having a vinyl unit content of 75 to 90%, X is a radical of a coupling agent and $(m-n) \geq 0$ and $(m+n)$ ranges from 3 to 25.

DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein: the FIGURE shows the tan delta curves for the examples of copolymer rubbers described in the examples.

DETAILED DESCRIPTION OF THE PREFERRED EMBODIMENT

A principle of interlinking rubber has now been found. It is now possible to attain clearly broadened tan delta curves (see FIG. 1) for a rubber. Because, as is known, the properties of rubber can be influenced favorably by broadening of the tan delta curve, a parameter for optimizing the properties of tires is now made available to the tire expert. The rubber of the present invention exhibits the known advantages of coupled rubbers (cf. EP-OS 0 090 365), as well as the advantages of rubber of high vinyl content (K. H. Nordsiek, K. M. Kiepert, Kautschuk und Gummi, Kunstoffe 35, 371 (1982). The present styrene-containing rubber comprises a statistical distribution of styrene units. The content of block polystyrene components is below 2%.

A dual batch process for the manufacture of the present rubber, which is an aspect of the present invention, provides a high coupling yield.

The unsaturated elastomeric asymmetrically coupled block copolymer of the invention has the formula: $(A)_n$—X—$(B)_m$ based on butadiene, styrene and optionally isoprene monomers. The block copolymers preferably contain 40 to 90% butadiene, 5 to 35% styrene and 0 to 40% isoprene. A and B are different elastomeric blocks. X represents the moiety of a polyfunctional coupling agent. The numeral m is at least as large as n, and the sum total of m and n should on the one hand be at least 3 and, on the other hand, at most 25. The blocks A preferably constitute 40 to 80% of the copolymer, while the blocks B correspondingly constitute 60 to 20% of all blocks in the block copolymer. The blocks A preferably consist exclusively of butadiene units having a vinyl group content between 8 and 60%, although the blocks A can be formed of from 0 to 60% of butadiene units, at least 10% of isoprene units and a maximum of 45% styrene units. The content of vinyl and 3,4 isopropenyl groups in the copolymer based on block B, is within the range of 75 to 90%.

An aspect of the invention is that a dual batch process is employed for the manufacture of the present block copolymer by the polymerization of the monomers in an inert organic solvent in the presence of a monofunctional Li compound. In the process blocks A and B are produced independently from each other in two vessels, and then the reactor contents are combined. Thereafter, the blocks are coupled.

It is recommended to add a cocatalyst to the reaction medium during the polymerization of Block B.

In the present process the asymmetrically coupled block copolymers of the invention are formed quite predominantly. In principle, it is also possible for symmetrically coupled block copolymers to form. However, from tests which have been conducted it is apparent that the content of such products in the product is very low. For that reason, asymmetrically coupled products are the only products consistently referred to in the text.

The present invention is related to but different from the invention described in copending application "Unsaturated, Elastomeric, Asymmetrically Coupled Block Copolymers, A Single Batch Process for their Manufacture and their use for the Production of Tire Components" having Ser. No. 07/416,998 filed Oct. 5, 1989 in the following respects:

i) The block copolymer of the present invention has the form $(A)_n$—X—$(B)_m$, while the block copolymer of the copending application on the above other hand, is $(A-B)_n$—X—$(B_m$.

(ii) The block copolymer of the present invention is produced by a dual batch process, whilst the block copolymer of the above copending application is produced by a single batch process.

In the present process, an inert organic solvent is used as the reaction medium. Suitable solvents include hydrocarbons having 5 to 12 carbon atoms such as pentane, hexane, heptane, octane and decane, as well as their cyclic analogues. Also suitable are aromatic solvents such as, for example, benzene, toluene, xylene and others. It stands to reason that mixtures of the above described solvents can also be employed.

Alkyl lithium compounds which can readily be obtained by the conversion of lithium with the corresponding alkylhalogenides are employed as catalysts. The alkyl moieties comprise 1 to 10 carbon atoms. Individual hydrogen atoms may be substituted by phenyl groups. The following alkyl lithium compounds are particularly suitable and include methyl lithium, ethyl lithium, pentyl lithium, and n-butyl lithium.

The catalyst is added at the start of polymerization of block A and of block B.

The nature and amount of catalyst and branching agent are generally so selected that the block copolymer obtained has the following properties: Mooney viscosity ($ML_{1-4}$, 100° C., DIN 53 523): 35 to 120; Nonuniformity $U=(Mw/Mn)-1$, determined by gel permeation chromatographic analysis (GPC analysis): 0.6 to 4.0; Defo elasticity (80° C., DIN 53 514): $\geq 20$.

In the present process block B is prepared in the presence of a cocatalyst. In this case the object is to obtain polymers having the highest possible content of 1,2 and/or 3,4 structural units.

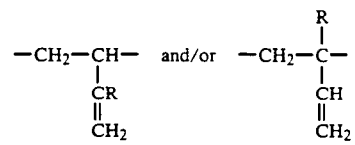

R = H (butadiene)
R = CH₃ (isoprene)

The catalyst employed is chosen for its ability to maintain the living polymer ends and to control the microstructure, i.e. the manner in which the polymerization proceeds as it is directed to as complete as possible a formation of 1,2 and/or 3,4 structural units.

Suitable cocatalysts comprise dialkyl ethers of ethylene glycol, with their alkyl groups each comprising up to 4 carbon atoms such as ethylene glycol diethyl ether (DEE). Ethers of the formula

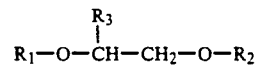

are preferred wherein $R_1$ and $R_2$ each represent alkyl moieties having different numbers of carbon atoms selected from the group of methyl, ethyl, n- and isopropyl, as well as n-, iso-, sec.- and tert. butyl, and $R_3$ represents hydrogen, methyl or ethyl. Preferably the sum total of the carbon atoms of the two moieties $R_1$ and $R_2$ is from 5 to 7, more particularly 6. A particularly suitable ethylene glycol ether is the compound wherein $R_1$ is ethyl, $R_2$ is tert. butyl and $R_3$ is H.

The glycol ethers of the present invention are prepared, for example, by the Williamson synthesis from a sodium alcoholate and an alkyl halogenide. The ethers of the formula:

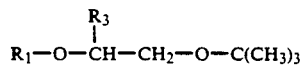

may be produced in a simple manner by reacting the corresponding alcohol

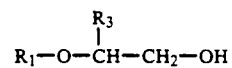

with isobutene in the presence of an acid ion exchanger.

The cocatalyst is employed in the reaction in a ratio of 2:1 to 30:1, in particular 2:1 to 15:1 based on the mole number of the catalyst. At higher temperatures larger quantities of cocatalyst are generally required in order to attain the desired microstructure control. Reaction temperatures of 100° C should not be exceeded. It is possible, also, to operate at increasing or decreasing temperatures. In that case, however, care must be taken that the microstructure does not suffer fundamental change.

When producing block A, the amount of cocatalyst which is present depends on the desired content of vinyl groups in the polymer. In the production of the block B, styrene is added as a comonomer. Care must be taken by suitable expedients to ensure that the content of polystyrene blocks does not exceed 2% by weight. A process for determining the content of polystyrene blocks is described in the textbook Houben-Weyl "Methoden der Organischen Chemie", vol. 14/1 (1061), page 698.

It is known that certain compounds, useful as cocatalysts in the present invention, have the property of suppressing the formation of polystyrene blocks. The same property is present in compounds which are known as randomizers and which are usually potassium salts of alcoholates, as well as organic carboxylic and sulfonic acids. In the event that the randomizing effect of the cocatalyst is inadequate, it is possible to add randomizers.

Suitable coupling agents include polyepoxides such as epoxidized linseed oil, polyisocyanates, polyketones such as 1,3,6-hexanetrione, polyanhydrides, for example the dianhydride of pyromellitic acid and dicarboxylic acid esters such as adipic acid dimethylester. Particularly suitable are:
  (i) The tetrahalogenides of the elements Si, Ge, Sn and Pb, in particular $SiCl_4$.
  (ii) Organic compounds of the formula: $R_n[SiHal_3]n$, wherein $n=1$ to 6, in particular $n=1$ and 2. In this context R is an organic moiety having a valency of n, for example, an aliphatic, cycloaliphatic or aromatic moiety having 6-16 carbon atoms. 1,2,4-Tris(2-trichlorosilylethyl)cyclohexane, 1,8-bis(trichlorosilyl)octane and 1-(trichlorosilyl)octane are examples of such compounds.
  (iii) Organic compounds which contain at least moiety$=SiHal_2$, e.g. dimethylsilylchloride.
  (iv) Halogen hydrosilanes of the formula $Si(H)_m(Hal)_{4-m}$, wherein m is from 3 to 1.
  (v) Di- and trivinylbenzenes, such as 1,4-divinylbenzene.

Divinyl benzene is preferred as a coupling agent.

The copolymerization reaction should be conducted under a non-oxidizing inert atmosphere such as nitrogen gas. Further, the polymerization temperature ranges from 0°-150° C. In particular, the desired microstructure of the copolymer and economic considerations contribute to the selection of a suitable temperature in that the 1,2 BR and 3,4 IR contents depend on the polymerization temperature selected, as well as the BuLi:- cocatalyst ratio (microstructure regulator).

The process may be conducted discontinuously as well as continuously.

One of skill in the art practicing the present invention will be able to by means of the tan delta curve to produce, by varying the reaction conditions, block copolymers which can be processed into tire treads having the desired combinations of properties.

The amorphous polymers obtained are mixed with active reinforcing fillers, a vulcanizing agent and conventional additives if they are to be converted into vulcanization products. Generally speaking, it is necessary to carry out such mixing in the presence of shear forces. Compositions which are intended for the manufacture of tire treads are generally formed as rough strips. During the homogenization and molding which may, for example, take place in an extruder, the conditions of temperature and time are so selected that no vulcanization takes place.

The rubber component in the vulcanizable compositions may, for example, comprise more than 70, and in particular 100 weight % of a block copolymer of the invention and 0 to 30 weight % of a known amorphous general purpose rubber such as styrene-butadiene rubber, 1,4-cis-polybutadiene, 1,4-cis-polyisoprene and natural rubber. If desired the content of all purpose rubber may even be increased substantially higher.

Active, reinforcing fillers which may be included in the composition include, for example, tire tread carbon blacks of various activities, optionally treated with silane bonding agents, highly dispersed silicic acids and mixtures thereof.

Conventional vulcanizing agents may also be included which contain, e.g., sulfur, in combination with accelerators. The amount of vulcanizing agents depends on the remaining components in the vulcanizable composition and can be determined by simple preliminary tests.

Plasticizer oils, as conventionally used in rubber technology, preferably aromatic, aliphatic and naphthenic hydrocarbons and conventional auxiliaries, for example, zinc oxide, stearic acid, rosin acids, ageing protective agents and ozone protective waxes may serve as additives, added in conventional quantities.

The block copolymer of the present invention is suitable for the manufacture of tire treads for automobile tires and truck tires. Thus, the block copolymer is useful for the manufacture of new tires and also for the retreading of old tires.

The tire treads prepared from the present copolymer are characterized in particular by the following advantageous properties:
  (i) high skid resistance under wet conditions,
  (ii) high abrasion resistance,
  (iii) low rolling resistance and thus low fuel consumption,
  (iv) high wear resistance, and
  (v) all-weather suitability.

Having now generally described this invention, a further understanding can be obtained by reference to certain specific examples which are provided herein for purposes of illustration only and are not intended to be limiting unless otherwise specified.

A hydrocarbon mixture comprising about 50% hexane was employed in the following examples as the solvent. Additional components of this hydrogenated $C_6$ fraction were in particular pentane, heptane and octane and their isomers. The solvent was dried over a molecular sieve of pore size 0.4 nm, such that the water content was decreased below 10 ppm, followed by $N_2$ stripping.

The organic lithium compound employed was n-butyl lithium which, unless stated otherwise, was employed in the form of a 20 weight % solution in hexane.

The monomers isoprene and styrene were boiled under reflux over calcium hydride for 24 hours prior to use, then distilled and titrated to the end point with n-butyl lithium in the presence of o-phenanthroline.

The glycol ethers were distilled over calcium hydride and subsequently titrated to the end point with n-butyl lithium in the presence of o-phenanthroline.

The divinyl benzene (DVB) was present as a mixture of m- and p-divinylbenzene and was employed in the form of a 64% solution in hexane. The extent of conversion was determined by determining the solids content after evaporating off the solvent and the monomers.

The tan delta curves were determined with a torsion pendulum according to Schmieder Wolf as described in DIN 53 520.

The coupling yield is considered to be the percentage of rubber which, after conversion with a coupling agent, comprises a star-shaped structure and is characterized, as compared with the non-coupled rubber, by a considerably higher molecular mass. This is determined by GPC analysis, tetrahydrofuran being used as the solvent and polystyrene as the column material. The polymers are characterized by means of a light scattering detector. For this purpose samples are taken from the reactor prior to the addition of the coupling agent and also towards the end of the reaction. The Defo hardness (DH) and the Defo elasticity (DE) were determined by conventional measuring methods (DIN 53 514).

Parts are given in terms of parts by weight, while percentages (%) are expressed in terms of weight %.

COMPARATIVE EXAMPLE A

392 Parts of hexane and 67 parts of 1,3-butadiene were initially introduced into a stainless steel V2A agitating autoclave rinsed with dry nitrogen. This was followed by heating to 50° C. and titration with 5% solution of n-butyl lithium in hexane with thermoelectric control. The polymerization was started at 50° C. by the addition of 0.051 parts n-butyl lithium. The temperature was kept constant by cooling and the batch was polymerized to completion.

Simultaneously, in a second V2A reactor, 261 parts hexane, 33 parts isoprene and 0.83 parts 1-ethoxy-2-tert.-butoxy ethane were introduced, titrated and polymerized to completion with 0.030 parts n-butyl lithium at 50° C. Thereafter, the contents of the second reactor were so added into the first reactor that the live ends were not interrupted. Thereafter, 0.79 parts DVB were added. After one hour at 50° C., the contents were cooled to room temperature and 0.5 parts 2,2'-methylene-bis-(4)-methyl-6-tert.-butyl phenol were added. The rubber so obtained was precipitated with a mixture of isopropanol and methanol in a volume ratio of 80:20 and dried for 24 hours at 70° C. in a circulatory air drying cabinet.

EXAMPLE 1

357 Parts hexane and 61 parts 1,3-butadiene were first introduced into a first stainless steel V2A agitating autoclave rinsed with dry nitrogen. The contents were heated to 50° C. and titrated with a 5% solution of n-butyl lithium in hexane with thermoelectric control. The polymerization was started at 50° C. by the addition of 0.048 parts n-butyl lithium. The temperature was kept constant by cooling and the batch was polymerized to completion. Simultaneously, in a second V2A reactor, 238 parts hexane, 15 parts isoprene, 15 parts styrene and 9 parts butadiene-1,3 and 0.76 parts 1-ethoxy-2-tert.-butoxy ethane were first introduced, titrated and then fully polymerized with 0.027 parts n-butyl lithium at 50° C. in an analogous manner. Thereafter the contents of the second reactor were so added into the first reactor that the live ends were not interrupted. Then 0.72 parts DVB were added. After one hour, the contents were cooled to 50° C. and 0.5 parts 2,2'-methylene-bis-(4)-methyl-6-tert.-butyl phenol were added. The rubber so obtained was precipitated with a mixture of isopropanol and methanol in a volume ratio of 80:20 and dried for 24 hours at 70° C. in a circulatory air drying cabinet.

| Composition of the block copolymerization products | | | | | |
|---|---|---|---|---|---|
| | Butadiene | | Isoprene | | | Styrene |
| Example | 1,4-trans | 1,4-cis | 1,2 | 3,4 | 1,4 | — |
| A | 35 | 27 | 8 | 27 | 3 | — |
| 1 | 32 | 26 | 12 | 11 | 2 | 17 |

| Macro structure of the block copolymerization products | | |
|---|---|---|
| Example | U[1] | K[2] |
| A | 2.9 | 60 |
| 1 | 2.6 | 80 |

[1] U = non-uniformity
[2] K = coupling yield

Comparative Example A, as well as Example 1, describe the production of asymmetrically block copolymers. The drawing shows that only the block copolymers of the present invention, as per Example 1, yield the desired broad tan delta curves.

Having now fully described the invention, it will be apparent to one of ordinary skill in the art that many changes and modifications can be made thereto without departing from the spirit or scope of the invention as set forth herein.

What is claimed:

1. An unsaturated elastomeric, asymmetrically coupled block copolymer of the formula: $(A)_n$—X—$(B)_m$, wherein block A is a block of polybutadiene having a content of uniformly distributed vinyl groups ranging from 8 to 60% and block (B) is a homopolymer of isoprene or a copolymer of at least 10% isoprene with 0 to 60% butadiene and up to 45% styrene, said copolymer having a vinyl coupling agent and $(m-n) \geq 0$ and $(M+n)$ ranges from 3 to 25.

2. The block copolymer of claim 1, wherein the coupled block copolymer contains 40–90% of butadiene, 5 to 35% styrene and 10% to 40% isoprene.

3. The block copolymer of claim 2, wherein block A represents 40 to 80% of all blocks and block B represent 60 to 20% of all blocks.

4. An unsaturated elastomeric, asymmetrically coupled block copolymer of the formula: $(A)_n$—X—$(B)_m$, wherein block A is a block of polybutadiene having a content of uniformly distributed vinyl groups ranging from 8 to 60% and block (B) is a copolymer of at least 10% isoprene and butadiene, said copolymer having a vinyl unit content of 75 to 90%, X is a radical of a divinylbenzene coupling agent and $(m-n) \geq 0$ and $(m+n)$ ranges from 3 to 25.

* * * * *

UNITED STATES PATENT AND TRADEMARK OFFICE
CERTIFICATE OF CORRECTION

PATENT NO. : 5,061,758
DATED : October 29, 1991
INVENTOR(S) : HELLERMANN ET AL It is certified that error appears in the above-identified patent and that said Letters Patent is hereby corrected as shown below:

| Col. | Line | |
|---|---|---|
| 3, | 48, | delete "5" and insert --4--; |
| 8, | 49, | (Claim 1) after "vinyl" insert --unit content of 75 to 90%, X is a radical of a--; |
| 8, | 50 | (Claim 1) delete "M" and insert --m--. |

Signed and Sealed this

Fourteenth Day of September, 1993

*Attest:*

BRUCE LEHMAN

*Attesting Officer*  *Commissioner of Patents and Trademarks*